US009732860B2

(12) United States Patent
Blecha et al.

(10) Patent No.: US 9,732,860 B2
(45) Date of Patent: Aug. 15, 2017

(54) VALVE, IN PARTICULAR A VACUUM VALVE

(71) Applicant: VAT Holding AG, Haag (CH)

(72) Inventors: Thomas Blecha, Feldkirch (AT); Markus Nesensohn, Sulz (AT)

(73) Assignee: VAT HOLDING AG, Haag (CH)

( * ) Notice: Subject to any disclaimer, the term of this patent is extended or adjusted under 35 U.S.C. 154(b) by 0 days.

(21) Appl. No.: 14/753,436

(22) Filed: Jun. 29, 2015

(65) Prior Publication Data

US 2016/0003363 A1    Jan. 7, 2016

(30) Foreign Application Priority Data

Jul. 4, 2014 (AT) .................................. A535/2014

(51) Int. Cl.
*F16K 3/02* (2006.01)
*F16K 3/18* (2006.01)
*F16K 51/02* (2006.01)
*F16K 35/02* (2006.01)

(52) U.S. Cl.
CPC .......... *F16K 3/0218* (2013.01); *F16K 3/0254* (2013.01); *F16K 3/18* (2013.01); *F16K 3/186* (2013.01); *F16K 35/02* (2013.01); *F16K 51/02* (2013.01)

(58) Field of Classification Search
CPC ........ F16K 51/02; F16K 35/02; F16K 3/0254; F16K 3/0218; F16K 3/10; F16K 3/16; F16K 3/18; F16K 3/182; F16K 3/184; F16K 3/188; F16K 31/1225; F16K 31/122
USPC ................................................. 251/193, 197
See application file for complete search history.

(56) References Cited

U.S. PATENT DOCUMENTS

| | | | | |
|---|---|---|---|---|
| 1,578,695 A | * | 3/1926 | Westrip ................. | F16K 3/0218 251/100 |
| 3,241,807 A | * | 3/1966 | Holderer ................ | F16K 3/188 251/158 |
| 3,352,535 A | * | 11/1967 | Power ...................... | F16K 3/16 251/187 |

(Continued)

FOREIGN PATENT DOCUMENTS

| | | |
|---|---|---|
| DE | 1550511 | 11/1969 |
| DE | 15550511 | 11/1969 |

(Continued)

*Primary Examiner* — Kevin Murphy
*Assistant Examiner* — David Colon Morales
(74) *Attorney, Agent, or Firm* — Volpe and Koenig, P.C.

(57) ABSTRACT

A valve having a closure member which is pressed against a valve seat in a closed position and closes an opening, and having a first valve drive for moving the closure member along a first movement path back and/or forth between a maximum open position and an intermediate position, and having a second valve drive for moving the closure member along a second movement path back and/or forth between the intermediate position and the closed position. The first movement path and the second movement path are arranged in an angled manner with respect to one another. The valve additionally includes at least one locking device with at least one locking body which interacts with at least one inclined surface and/or comprises at least one inclined surface, wherein the locking body is movable relative to the closure member along a third movement path between a locking position and a releasing position.

10 Claims, 9 Drawing Sheets

(56) References Cited

U.S. PATENT DOCUMENTS

| | | | | |
|---|---|---|---|---|
| 5,566,922 A * | 10/1996 | Tanaka | F16K 3/188 | 251/157 |
| 5,755,255 A * | 5/1998 | Iwabuchi | F16K 3/184 | 137/341 |
| 5,934,646 A * | 8/1999 | Tamura | F16K 3/18 | 251/193 |
| 5,975,492 A * | 11/1999 | Brenes | F16K 3/0254 | 251/175 |
| 6,056,266 A * | 5/2000 | Blecha | F16K 3/0218 | 251/158 |
| 6,082,706 A * | 7/2000 | Irie | F16K 3/184 | 251/158 |
| 6,095,741 A * | 8/2000 | Kroeker | F16K 3/18 | 251/193 |
| 7,036,794 B2 * | 5/2006 | Duelli | F16K 3/0254 | 137/488 |
| 7,100,892 B2 * | 9/2006 | Iwabuchi | F16K 51/02 | 251/187 |
| 7,611,122 B2 * | 11/2009 | Tichy | F16K 3/18 | 251/158 |
| 7,762,527 B2 * | 7/2010 | Schoen | F16K 3/18 | 251/175 |
| 8,002,238 B2 * | 8/2011 | Gantner | F16K 3/182 | 251/193 |
| 8,141,847 B2 * | 3/2012 | Fischer | F16K 3/18 | 137/2 |
| 2006/0124886 A1 * | 6/2006 | Brenes | F16K 3/188 | 251/326 |
| 2008/0083897 A1 * | 4/2008 | Chen | F16K 3/0254 | 251/193 |
| 2010/0090145 A1 * | 4/2010 | Maerk | F16K 3/0218 | 251/159 |
| 2010/0300920 A1 * | 12/2010 | Wagner | F16K 51/02 | 206/524.8 |
| 2011/0057136 A1 | 3/2011 | Ehrne | | |
| 2011/0108750 A1 * | 5/2011 | Ehrne | F16K 3/314 | 251/319 |
| 2011/0175011 A1 * | 7/2011 | Ehrne | F16K 3/182 | 251/366 |
| 2012/0285094 A1 * | 11/2012 | Kim | H01L 21/67126 | 49/358 |
| 2012/0298899 A1 * | 11/2012 | Geiser | F16K 51/02 | 251/158 |

FOREIGN PATENT DOCUMENTS

| | | |
|---|---|---|
| DE | 102008027944 | 7/2009 |
| EP | 1087159 | 3/2001 |
| GB | 1273761 | 5/1972 |
| JP | S63312574 | 12/1988 |
| JP | H281971 | 6/1990 |
| JP | H11218238 | 8/1999 |
| JP | 2002303372 | 10/2002 |
| JP | 2006200709 | 8/2006 |

* cited by examiner

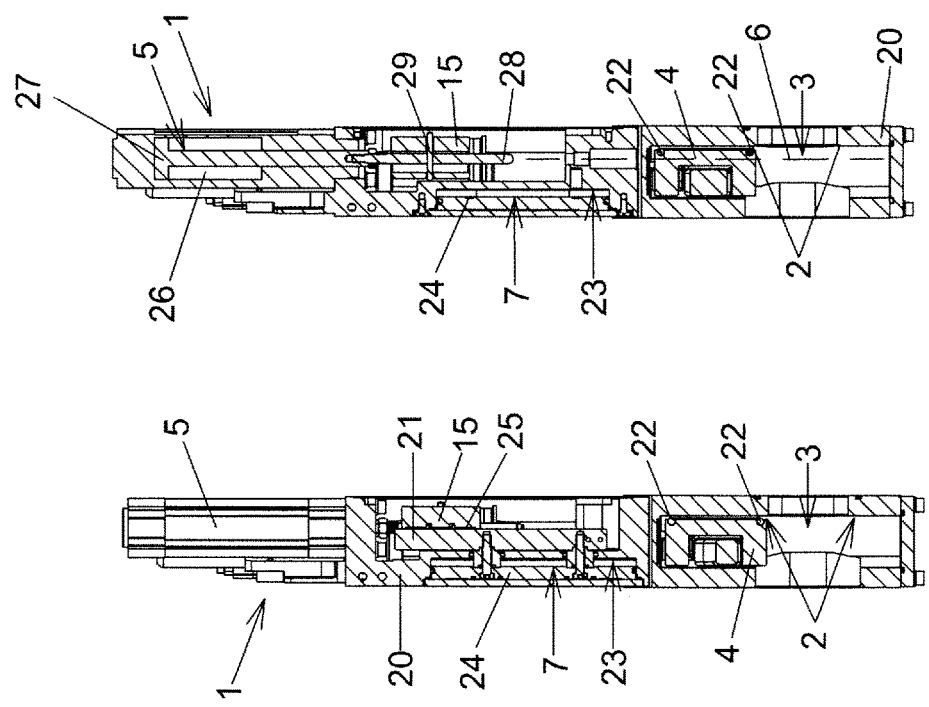
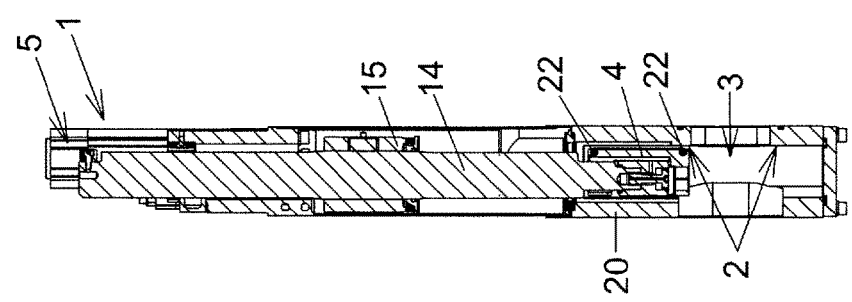
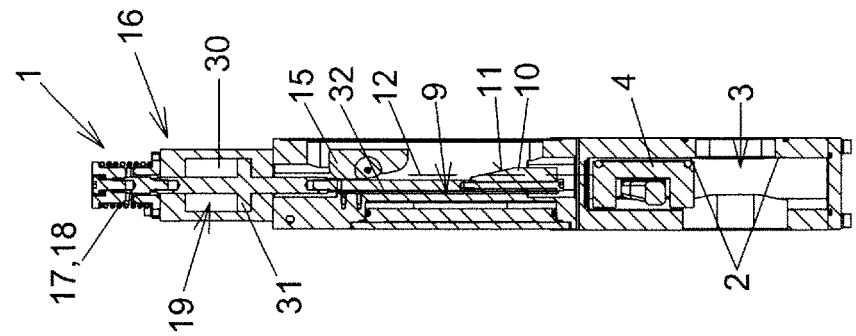

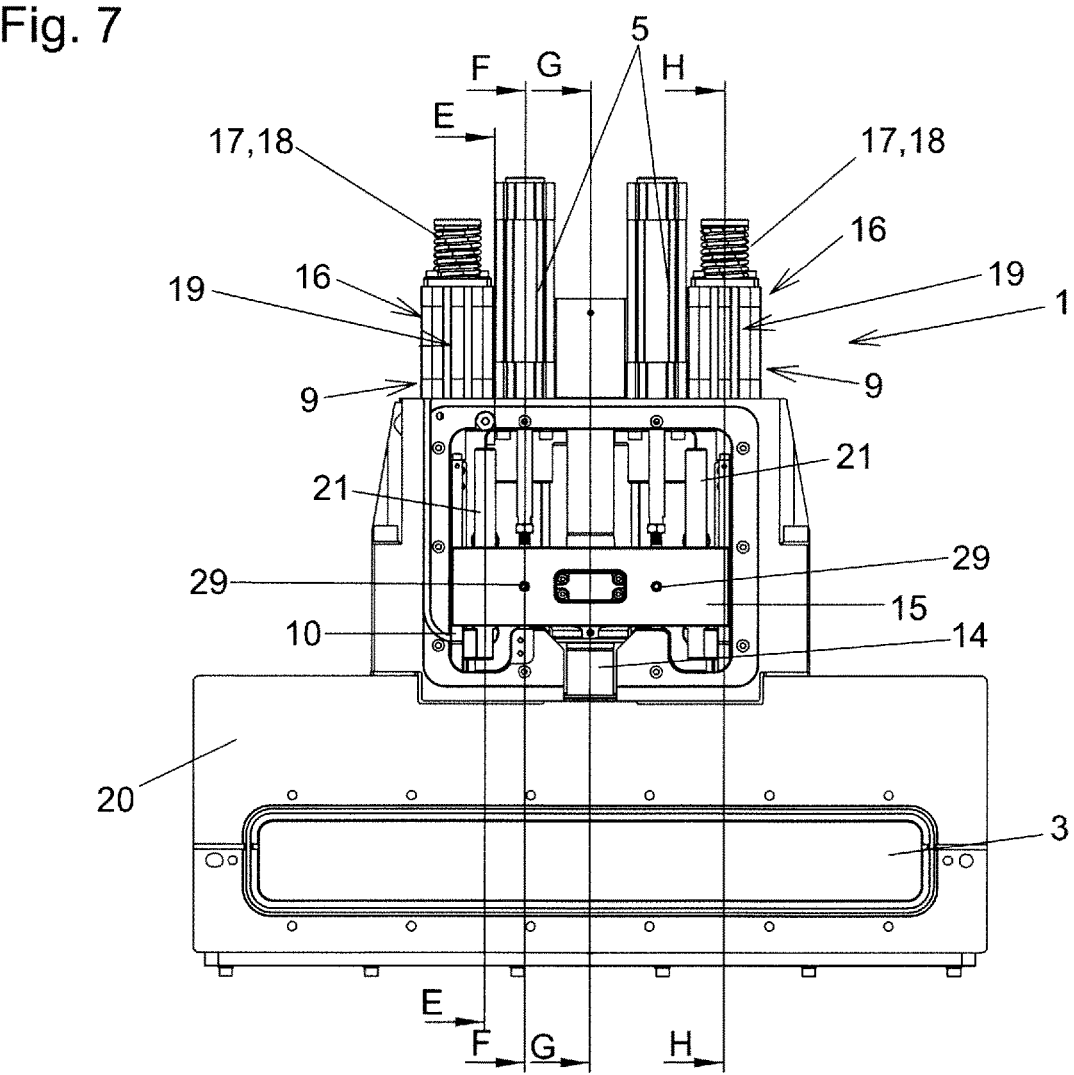

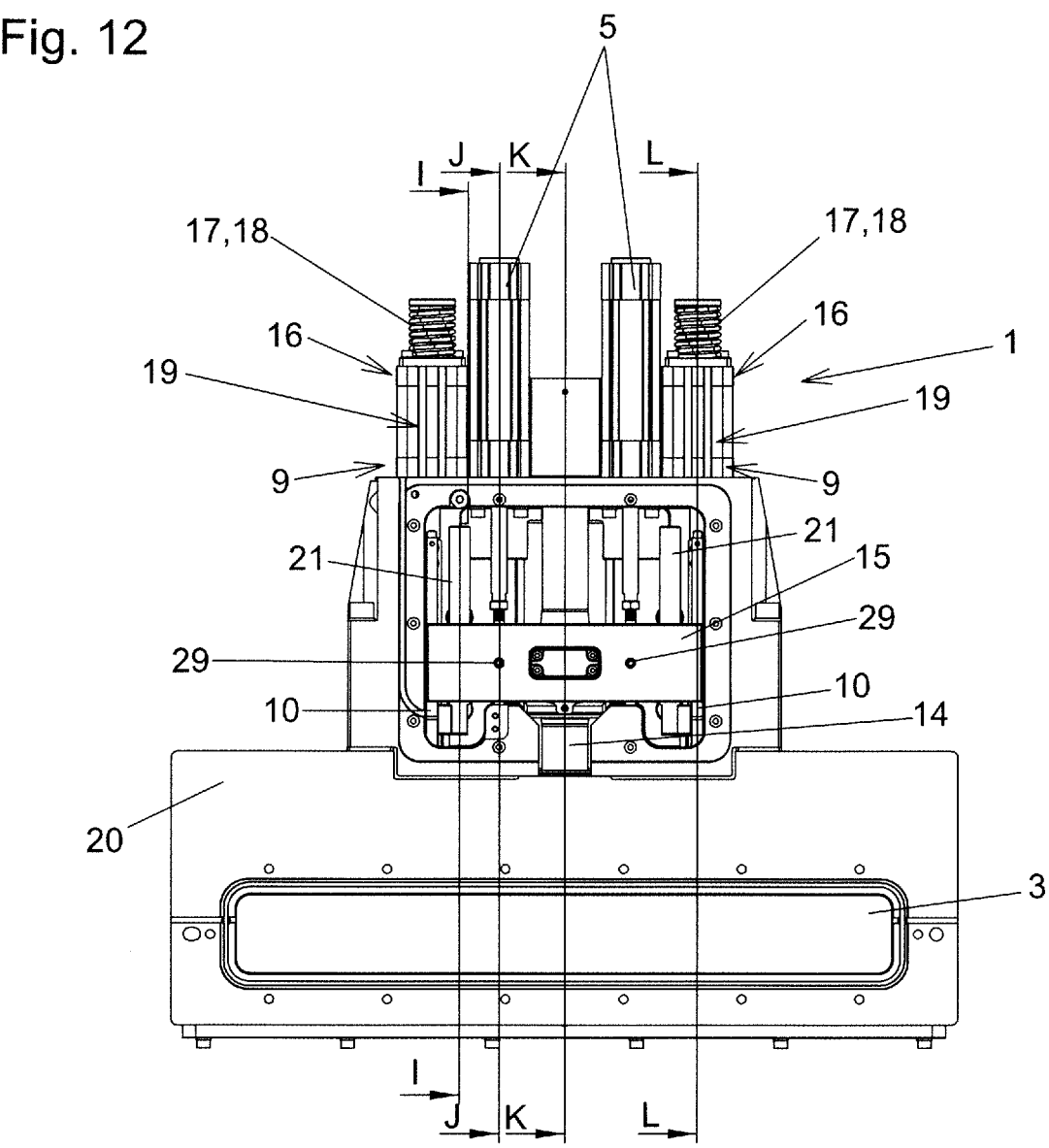

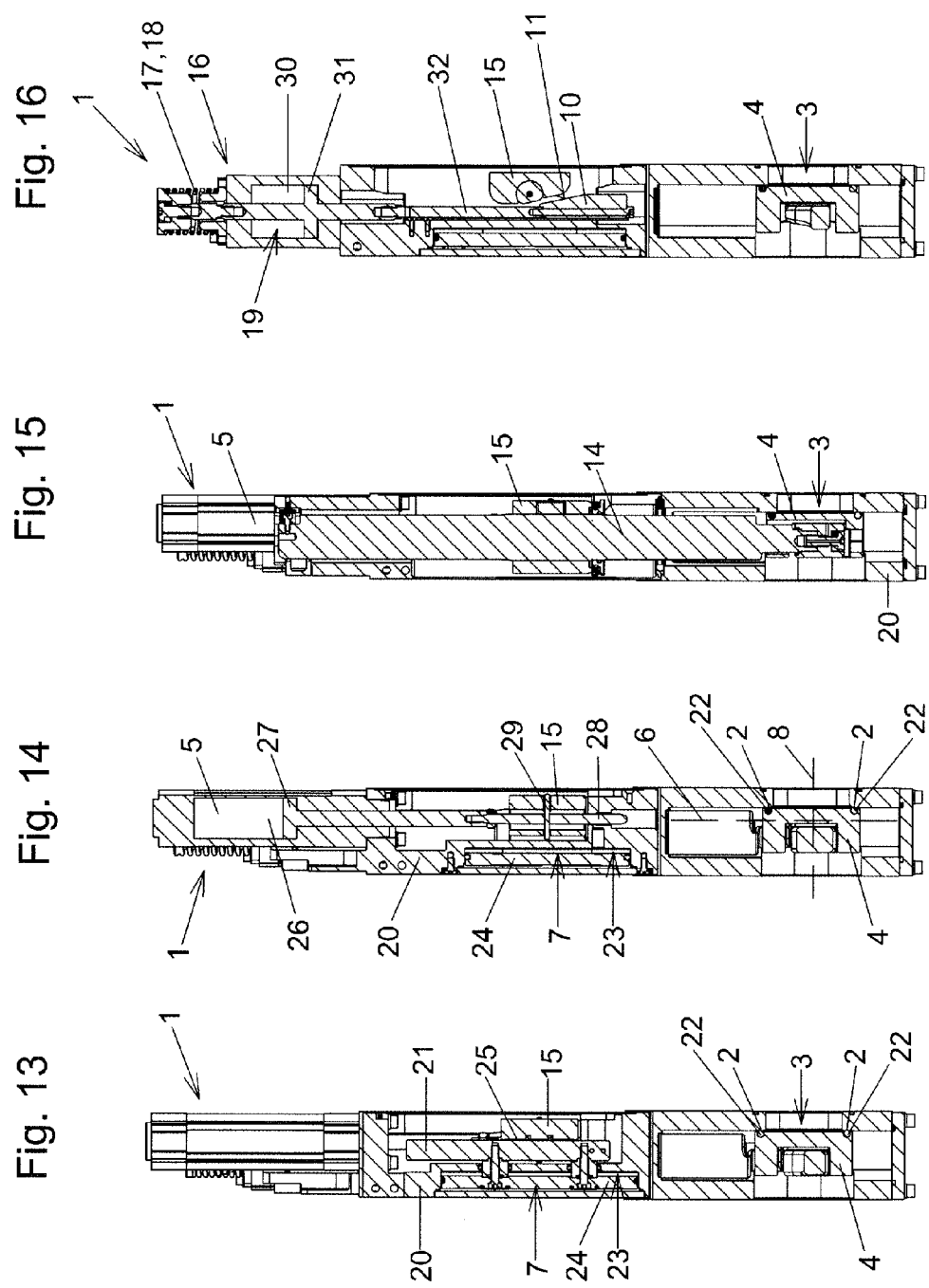

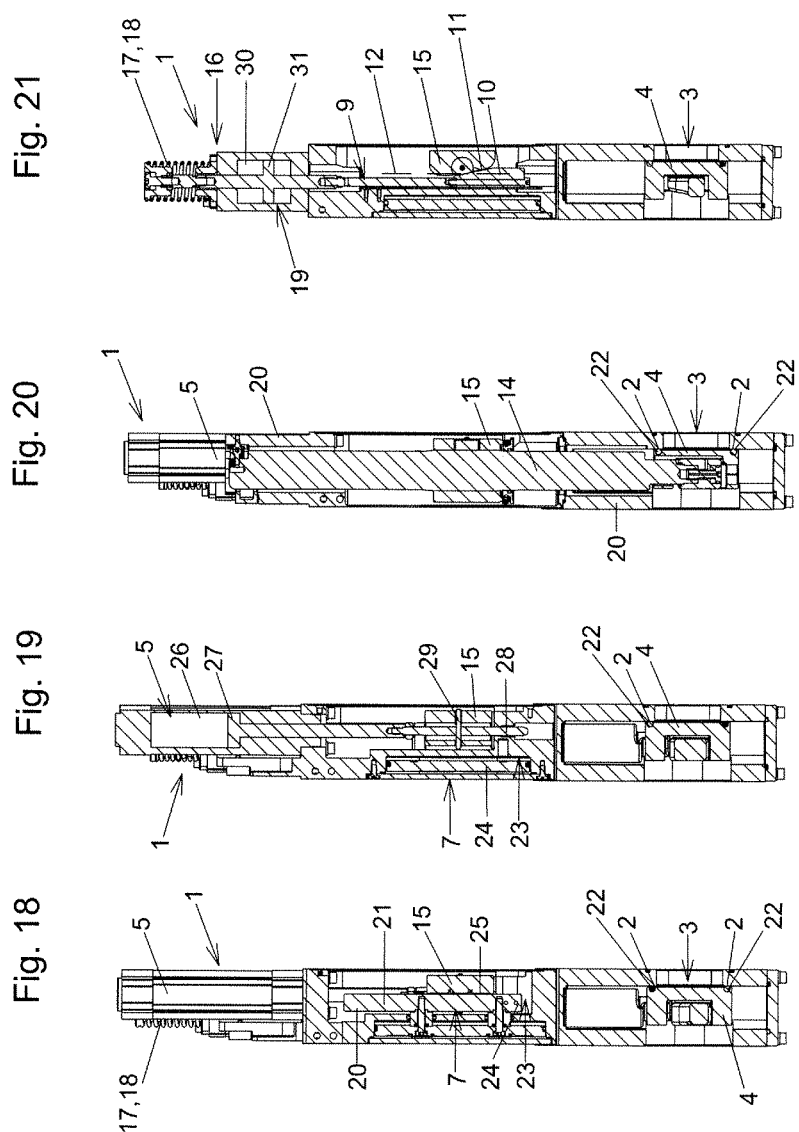

VALVE, IN PARTICULAR A VACUUM VALVE

INCORPORATION BY REFERENCE

The following documents are incorporated herein by reference as if fully set forth: Austrian Patent Application A535/2014, filed Jul. 4, 2014.

BACKGROUND

The present invention relates to a valve, in particular a vacuum valve, having an opening which is surrounded by a valve seat and having a closure member, wherein the closure member is pressed against the valve seat in a closed position and closes the opening, and in an intermediate position is raised from the valve seat and is arranged so as to be aligned with the opening, and in a maximum open position releases the opening completely or at least in part, wherein the valve comprises at least one first valve drive for moving the closure member along a first movement path back and/or forth between the maximum open position and the intermediate position and at least one second valve drive for moving the closure member along a second movement path back and/or forth between the intermediate position and the closed position and the first movement path and the second movement path are arranged in an angled manner with respect to one another, and wherein the valve additionally comprises at least one locking device for locking the closure member in the closed position.

Valves where the first movement path and the second movement path are arranged in a correspondingly angled manner with respect to one another are known, in principle, in the prior art. They are often used in vacuum technology and are also designated as so-called L-valves or J-valves. The more or less L-shaped or J-shaped movement of the closure member from the maximum open position into the closed position and vice versa is realized for the purposes of a long service life of the seal that is mounted on the valve seat and/or on the closure member in order to keep shear movements at the seal as small as possible or to exclude them.

Pneumatic and/or electric drives are frequently used as first and second valve drives in particular under vacuum. The problem with them in particular is that the closed position, in which the closure member is pressed against the valve seat, is only able to be held reliably for a certain time by means of the first and second valve drives. Once the gas supply or the current supply has been switched off, after a fairly long time the pressing forces of the drives decrease.

Generic EP 1 087 159 A1 makes known a corresponding valve, where, as a locking device for locking the closure member in the closed position, locking bolts are able to latch into corresponding openings of a piston of the first valve drive when the closure member is situated in the corresponding position. The problem with this solution of a locking device is that it is necessary to work with very small tolerances during the production thereof. If, when the valve is operating, certain, for example temperature-related, geometry deviations occur, there is the risk of the locking device no longer functioning as the locking bolts no longer reach into the opening of the piston.

SUMMARY

It is the object of the invention, consequently, to provide a generic valve with a locking device, it being possible to allow greater tolerances during the realization and/or operation of said locking device and nevertheless still to ensure the locking device has a high level of operational reliability.

To achieve this objective, proceeding from a generic valve, the invention provides that the locking device comprises at least one locking body which interacts with at least one inclined surface and/or comprises at least one inclined surface, wherein the locking body is movable relative to the closure member along a third movement path between a locking position, in which the closure member is locked in the closed position, and a releasing position, in which the closure member is movable out of the closed position into the intermediate position.

The advantage of the solution according to the invention with the at least one inclined surface is that at the same time very high tolerances can be allowed when producing and operating said locking device and nevertheless a very operationally reliable system is obtained. By means of the inclined surface, it is easily possible to compensate for deviations which are production-related and/or geometric deviations which occur during operation e.g. brought about by temperature, without this impacting negatively on the operational reliability of the locking device.

In a first group of embodiments of the invention, it can be provided that the inclined surface is arranged and/or realized on the locking body itself. However, the locking body can just as well also interact with at least one inclined surface which is connected directly or indirectly to the closure member. It can also be provided that an inclined surface is present in each case both on the locking body and on the component of the valve with which the locking body directly interacts, with these two inclined surfaces then interacting with one another.

In particularly preferred embodiments of the invention, it is provided that the third movement path is arranged at an acute angle relative to the inclined surface. For the sake of completeness, it is pointed out that in the releasing position of the locking body, the closure member, as a rule, is not only movable from its closed position into the intermediate position and vice versa, that is along the second movement path, but in a favorable manner is also movable back and forth along the first movement path, that is between the maximum open position and the intermediate position.

In principle, it is possible for the locking body to act directly on the closure member with its at least one inclined surface or by means of at least one inclined surface. However, as an alternative to this, it is also possible just as well in terms of the invention for the locking body to act indirectly on the closure member with the inclined surface and/or by means of the closure surface. A preferred variant of this indirect action provides that the closure member is connected to a yoke by means of at least one valve rod and the locking body acts directly on the yoke with the inclined surface and/or by means of the inclined surface. For realizing the inclined surface, for example the locking body and/or the yoke and/or the closure member and/or another component of the valve that is connected to the closure member can be realized in a wedge-shaped manner. The third movement path, that is the movement path along which the locking body is moved back and forth between its locking position and its releasing position, is arranged, in preferred embodiments, parallel to the first movement path, that is to the movement path along which the closure member is moved back and forth between the maximum open position and the intermediate position.

The intermediate position is shown once again in detail further below by way of the exemplary embodiments. It is the position where the closure member is raised from the valve seat but still otherwise covers the opening, that is, it is in alignment with the opening. In contrast to this, it is provided in the maximum open position that the closure member opens the opening completely or in part, that is, it no longer covers it, such that fluids and/or above all, however, components to be worked or treated are able to be guided through the opening.

Particularly preferred variants of the invention provide that the locking device comprises at least one locking drive in addition to the first valve drive and in addition to the second valve drive for the movement of the locking body along the third movement path. In a preferred manner, this is at least one own drive for the locking body which makes it possible to move the locking body along the third movement path.

This locking drive is expediently designed such that it moves the locking device or the locking body automatically into the locking position or holds it in said position whenever an instruction to open and/or keep open the valve is not specifically given by means of a corresponding control or regulating unit of the valve. In this sense, preferred variants of the invention provide that the locking drive comprises a first locking drive unit which pre-stresses the locking body with the inclined surface permanently in the direction toward the locking position. The first locking drive unit, in a preferred manner, is a purely mechanical drive unit. In a particularly preferred manner in this sense, it is provided that the first locking drive unit has at least one elastic pre-stressing body, preferably a spring body, or comprises one such body. For opening the valve, it is expediently provided in these embodiments of the invention that the locking drive comprises a second locking drive unit for the movement of the locking body into the releasing position, wherein the second locking drive unit is switchable on and off. The second locking drive unit, in this case, consequently counteracts the first locking drive unit, whenever the second locking drive unit is specifically switched on. The switching on and off of the second locking drive unit can be effected, for example, by means of a corresponding control or regulating unit of the valve.

In a preferred manner, the closure member is a valve plate, that is in particular a flat closure member. In preferred realization variants, the openings to be closed by means of the closure member comprise cross sectional areas of between 40 cm$^2$ and 1000 cm$^2$, preferably between 60 cm$^2$ and 500 cm$^2$. The valves according to the invention could also be designated as a closure device.

As is known per se, at least one seal or also one seal in each case can be arranged both on the closure member and on the valve seat. The first movement path and/or also the second movement path are arranged at an angle with respect to one another. The movement paths can extend in a linear manner, but do not have to. This also applies to the third movement path. However, it is preferred that the first movement path, in particular, is realized in a linear manner. At an angle means that the first and second movement paths enclose an angle or are not parallel. In a preferred manner, the first and the second movement paths enclose an at least approximately orthogonal angle with respect to one another. The movement paths could also be designated as movement tracks. The first and second movement paths provide the path of movement of the closure member. These movement paths can be logged, for example, as a result of the path of a previously established point on the closure member being tracked during the movement of the closure member. The third movement path correspondingly describes the movement of the locking body with its inclined surface. Each movement path includes two directions which are opposite one another and are located one on top of the other or are arranged coaxially with respect to one another.

In a preferred manner, the closure member is fastened on a valve rod. Particularly preferred embodiments of the invention provide that that closure member is fastened on the valve rod and the first valve drive cooperates with the valve rod by means of an abovementioned yoke. In this context, it must also be mentioned that valves according to the invention can comprise not only one first valve drive for movement along the first movement path and/or only one second valve drive for movement along the second movement path and/or only one locking drive for movement of the locking body along the third movement path. Rather, it can also be provided that two or more of the named drives are realized for moving the closure member and/or the locking body back and forth in each case along the corresponding movement paths. In these embodiments, with the interposition, where applicable, of several transmission parts, each valve drive preferably having associated therewith its own transmission part, the first valve drives can cooperate with the yoke which is connected, preferably in a rigid manner, to the valve rod, the closure member being fastened in turn on the valve rod.

The most varied drive forms can be used as the first valve drive and/or also as the second valve drive and/or as the second drive locking unit. These can be hydraulic, pneumatic, electric, electromagnetic or other types of drive known in the prior art, in particular linear drives. In vacuum technology, however, pneumatic or electric drives are used in a preferred manner. Preferred variants in this connection provide that the first valve drive and/or the second valve drive and/or the second drive locking unit, preferably comprises or comprise in each case one piston-cylinder arrangement, at least one valve drive part of the valve drive, preferably of the respective valve drive, being a cylinder and at least one other valve drive part of the valve drive, preferably of the respective valve drive, being a piston which is guided in the cylinder. The first and/or second valve drive can be double acting piston cylinder arrangements which are suitable for moving the closure member both in the one direction along the respective movement path and in the opposite direction along the respective movement path. However, piston-cylinder arrangements which simply act in only one direction of the movement path can also be used. The other movement direction can then also be realized in the case of the first and/or second valve drive e.g. by means of springs, electrically or other suitable drives. In the case of piston-cylinder arrangements, the valve drive parts which are fixed to the housing can be both the pistons and the cylinders.

As already indicated in the introduction, valves according to the invention are used in a particularly preferred manner in vacuum technology, e.g. in order to close process chambers in which electronic components or the like are worked or produced. This is called vacuum technology in this context when operating states with pressures lower or equal to 0.001 mbar or 0.1 Pascal are achieved. Vacuum valves are valves which are designed for these pressure ranges and for corresponding differential pressures with respect to the surrounding area. Vacuum valves in the majority of cases then have a so-called vacuum region in which process states with said negative pressures are achieved. In the case of these embodiments of such valves or vacuum valves, the first and/or second valve drive or the first and/or the second valve drives and/or the locking drive or the locking drives are situated in a preferred manner outside the vacuum region. For defining and sealing the vacuum region from the region outside the vacuum region, bellows feedthroughs, slideways and the like, e.g. for the valve rod, are known in the prior art.

In the case of variants where the first and/or also the second valve drive and/or also the locking device is or are present in a more than a basic version, it is preferred to provide a symmetrical arrangement of the respective valve drives or of the locking devices. In a preferred manner, a corresponding plane of symmetry with reference to which said symmetry is provided is located such that the plane of symmetry extends through a symmetry axis of a valve rod and/or of the closure member.

BRIEF DESCRIPTION OF THE DRAWINGS

Further features and details of preferred embodiments of the invention are explained subsequently by way of an exemplary embodiment. The Figures are as follows:

FIGS. 2 to 6 show representations of said valve where the closure member is situated in the maximum open position;

FIGS. 7 to 11 show representations of said valve where the closure member is situated in the intermediate position;

FIGS. 12 to 16 show representations of said valve where the closure member is situated in the closed position and the locking body of the locking device is situated in the releasing position, and FIGS. 17 to 21 show representations of said valve where the closure member is situated in the closed position and the locking body of the locking device is situated in the locking position.

DETAILED DESCRIPTION TO THE PREFERRED EMBODIMENTS

Figure 1:
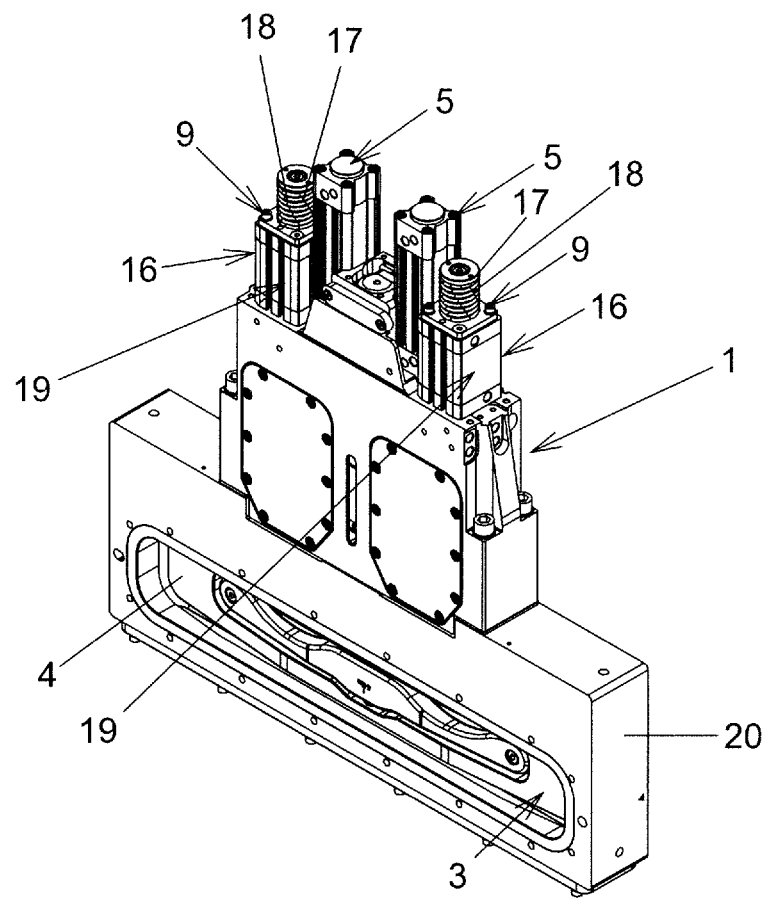
FIG. 1 is a perspective representation of the exemplary embodiment of a valve according to the invention.

The valve 1 of the exemplary embodiment shown here is a preferred embodiment of the invention in the form of a so-called vacuum valve which can be used in vacuum technology for the purpose of closing openings in process chambers, through which the workpieces to be worked are introduced into the process chamber and/or are removed from said process chamber, in a pressure-tight and/or gas-tight manner. FIG. 1 shows a perspective representation of the valve or vacuum valve 1 removed from the process chamber. In the case of the variant shown here, the closure member 4 is a valve plate. The opening 3 to be closed of the valve 1 is realized here in an approximately rectangular shape with rounded corners. The opening 3 is surrounded by the valve seat 2 of the valve 1. The valve seat 2 is part of the valve housing 20 in this case. However, this is not compulsory, the valve seat 2 can also be realized in principle on a separate component. In the exemplary embodiment shown, the seal 22 is situated on the closure member 4. This is not compulsory either. A seal 22 can be arranged just as well on the valve seat 2 or both on the valve seat 2 and on the closure member 4.

In FIG. 1 we can already see that, here in this exemplary embodiment, the first valve drive 5 is realized as a double unit. The second valve drive 7 is not visible in this representation, but is concealed in the valve housing 20. However, the locking drives 16 of the locking devices 9, said drives also realized here as a double unit, with the first locking drive units 17, which are realized here as elastic pre-stressing bodies 18 in the form of spring bodies, are visible. The second locking drive units 19 can only be seen from the outside in FIG. 1. Further details in this regard can be found in the following Figures.

Figure 2:
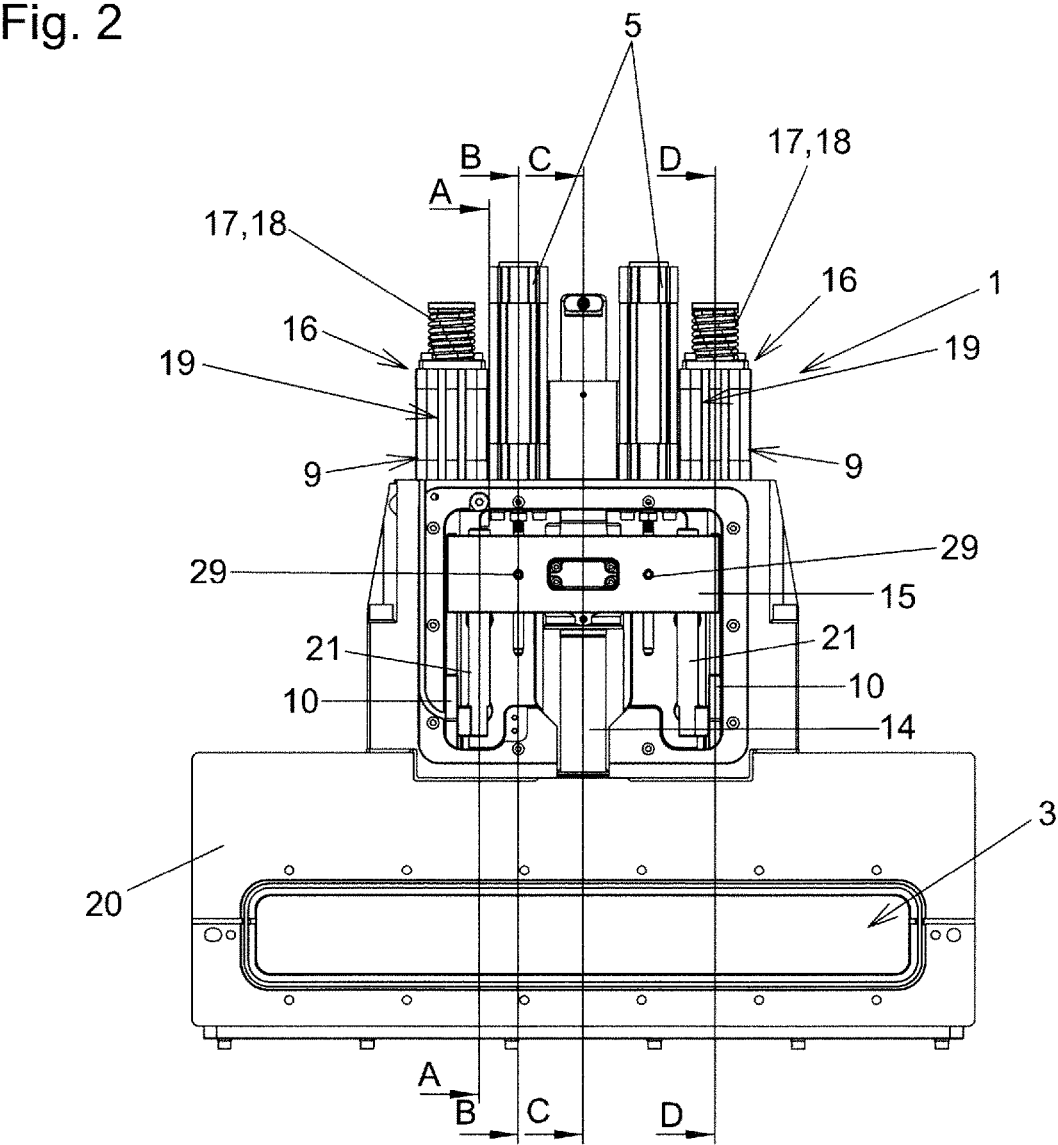

FIGS. 2 to 6 then show different representations of the valve 1 from FIG. 1, the closure member 4 being situated in each case in the maximum open position in which it releases the opening 3 fully in this exemplary embodiment. FIG. 2 shows a front view, part of the housing 20 being removed such that it is possible to see into the housing 20 in part. FIG. 3 shows the section along the angled line of intersection AA, FIG. 4 shows the section along the line of intersection BB, FIG. 5 shows the section along the line of intersection CC and FIG. 6 shows the section along the line of intersection DD from FIG. 2.

Figure 8:
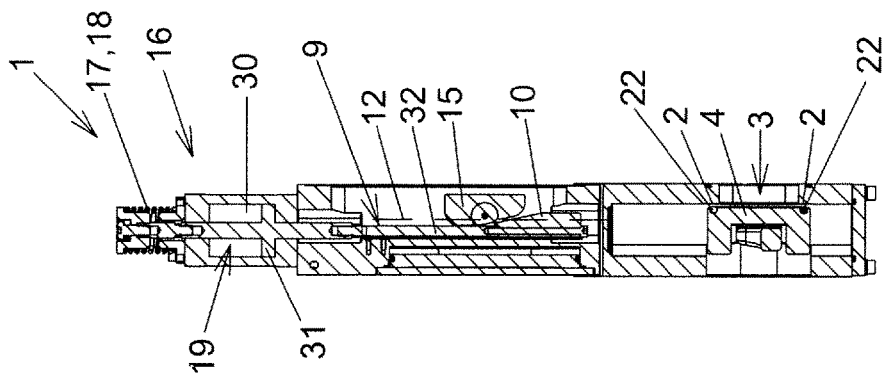
Figure 9:
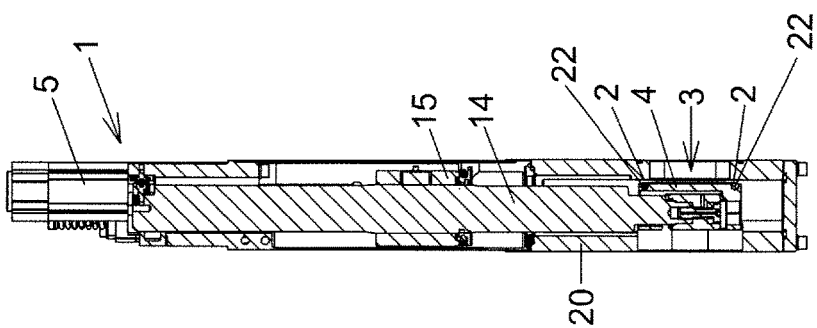
Figure 10:
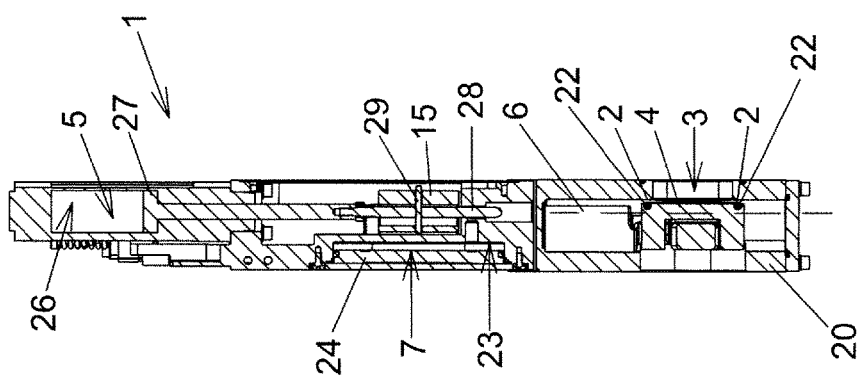
Figure 11:
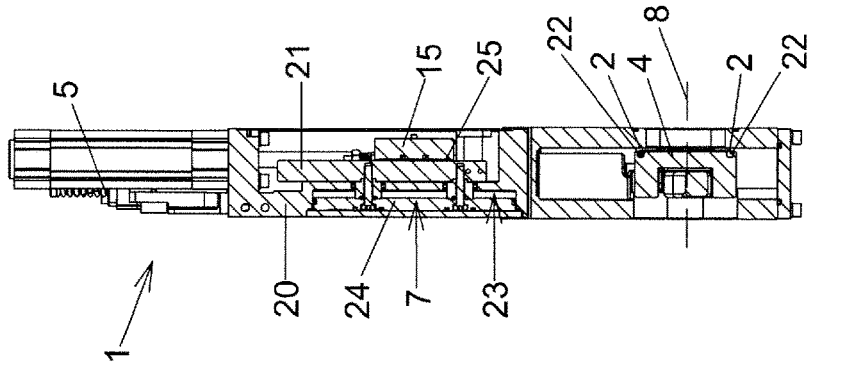
Figure 17:
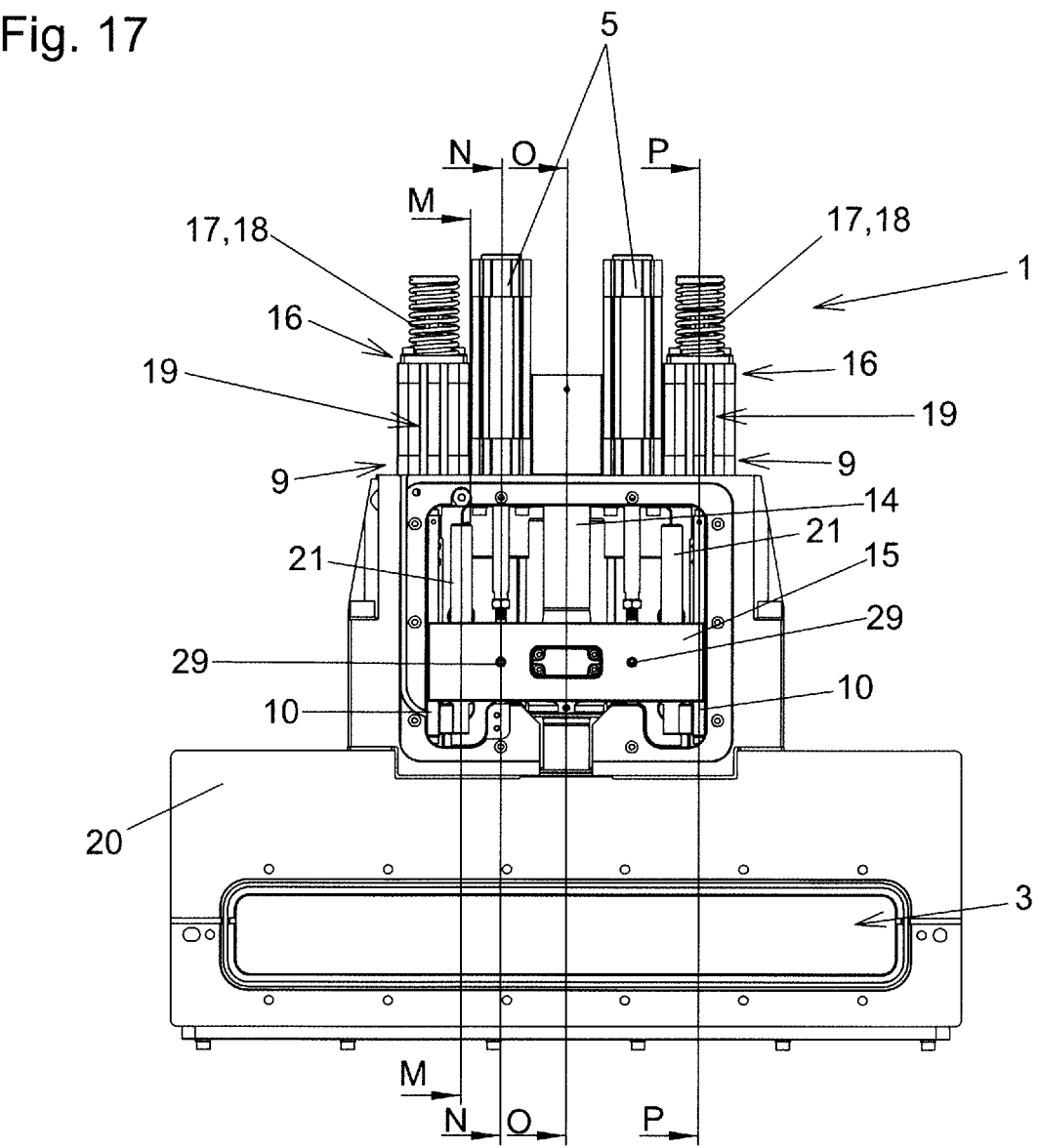

FIGS. 7 to 11 show the same valve 1 in an operating position in which the closure member 4 is situated in the intermediate position in which it covers the opening 3, that is it is in alignment with the opening 3, but does not yet close it. This can be seen well in the sectional representation according to FIGS. 8 to 11 as there the seal 22 does not yet abut against the valve seat 2. FIG. 8 shows the section along the angled line of intersection EE, FIG. 9 shows the section along the line of intersection FF, FIG. 10 shows the section along the line of intersection GG and FIG. 11 shows the section along the line of intersection HH.

FIGS. 12 to 16 show corresponding representations, however the closure member 4 here is situated in the closed position in which the opening 3 is closed and the closure member 4 is pressed with its seals 22 onto the valve seat 2. FIG. 13 shows once again the section along the angled line of intersection II, FIG. 14 shows the section along the line of intersection JJ, FIG. 15 shows the section along the line of intersection KK and FIG. 16 shows the section along the line of intersection LL from FIG. 12. In the representations according to FIGS. 2 to 16, the locking body 10 of the locking device 9 is situated in each case in the releasing position.

FIGS. 17 to 21 then show the situation in which the closure member 4 is situated in the closed position and the locking body 10 is moved into its locking position such that the closure member 4 is held by the locking device 9 in the closed position independently of the first valve drive 5 and of the second valve drive 7. FIG. 18 shows once again the section along the angled line of intersection MM, FIG. 19 shows the section along the line of intersection NN, FIG. 20 shows the section along the line of intersection OO and FIG. 21 shows the section along the line of intersection PP from FIG. 17.

In the exemplary embodiment shown, the closure element 4, the valve rod 14 and the yoke 15, which is fastened on the valve rod, form one module which can only be moved with one another. The first valve drive 5 is provided for the movement along the first movement path 6, that is from the maximum open position according to FIGS. 2 to 6 into the intermediate position according to FIGS. 7 to 11 and vice versa. In the exemplary embodiment, there are two first valve drives 5 which are realized in each case as double-acting piston-cylinder units with a piston 27 which is guided in the cylinder 26. Both the opening travel from the intermediate position into the maximum open position and the return travel in the opposite direction thereto from the maximum open position into the intermediate position can be carried out by means of said first valve drives 5. In the exemplary embodiment shown, for this purpose the piston 27 is connected by means of the piston rod 28 to the compensating pin 29 and by means of this is connected in turn to the yoke 15. A feedthrough, in which the compensating pin 29 is mounted so as to be displaceable orthogonally with respect to the first movement path 6 and parallel to the second movement path 8, is situated in the piston rod 28. The compensating pin 29 in this exemplary embodiment is arranged fixed on the yoke 15. As a result of said embodiment of the components 28, 29, and 15, the first valve drive 5 can be decoupled from a movement of the unit consisting of yoke 15, valve rod 14 and closure member 4 along the second movement path 8 by the yoke 15 with the compensating pin 29 being able to be displaced relative to the piston rod 28 in the case of said movements that are brought about by the second valve drive 7 along the second movement path 8. As a result, the first valve drive 5 can be fastened fixedly on the housing 20. This can be seen when comparing FIGS. 4 and 9 on the one hand 14 and 19 on the other hand.

In the exemplary embodiment shown, the second valve drive 7 is also in the form of a double-acting piston-cylinder unit. To this end, it comprises the piston 24 which is guided so as to be displaceable in the cylinder 23. The displacement of the piston 24 in the cylinder 23 is effected parallel to the second movement path 8 along which the closure member 4 is moved back and forth between the intermediate position and the closed position. For transmitting this movement of the piston 24 of the second valve drive 7 onto the closure member 4, the two pistons 24 of the second valve drives 7, which are also realized here as a double unit, are connected fixedly to the guide rods 21 in the exemplary embodiment shown. Once again, the yoke 15 is mounted on the guide rods 21 so as to be displaceable by means of the sliding bearings 25 in directions parallel to the first movement path 6. As a result, a displacement of the piston 24 in the cylinder 23 in a direction parallel to the second movement path 8 is transmitted by means of the guide rod 21, the yoke 15 and the valve rod 14 onto the closure member 4 such that said closure member can be moved along the second movement path 8 back and forth between the closed position according to FIGS. 12 to 21 and the intermediate position according to FIGS. 7 to 11.

By means of the first valve drives 5 and the second valve drives 7, the closure member 4 can consequently be moved back and forth in the manner indicated between the maximum open position and the intermediate position and the closed position as long as the locking device 9 permits this by the locking body 10 with its inclined surface being situated in its releasing position. This is the case in FIGS. 2 to 16, as can be seen particularly well in FIGS. 6, 11 and 16. If then, proceeding from the closed position according to FIGS. 12 to 16, the closure member 4 is to be locked in the closed position, this is effected by means of the locking device 9 according to the invention and in particular by means of the locking body 10 thereof which is provided with an inclined surface 11. For the sake of completeness, it must be pointed out that in this exemplary embodiment the locking device 9 is also realized as a double unit. The method of operation of the locking device 9 of said exemplary embodiment can be seen particularly well on the one hand by way of FIGS. 6, 11 and 16, which show the releasing position, and on the other hand by way of FIG. 21 which shows the locking position. The locking body 10, which is realized here in a wedge-shaped manner, with the inclined surface 11 is connected to the locking drive 16 of the locking device 9 in this exemplary embodiment by means of the transmission rod 32. The locking body 10, here in this example together with the inclined surface 11, is moved by means of the locking drive 16 along the third movement path 12, which here extends parallel to the first movement path 6. In the case of said movement along the third movement path 12, a relative movement is effected between the closure member 4 and the locking body 10 by means of the movement of the locking body 10. In this exemplary embodiment, it is also provided that the locking body 10 does not act directly on the closure member 4 with its inclined surface 11. Rather, indirect action of the locking body 10 on the closure member 4 is provided by the locking body 10 acting directly on the yoke 15 with its inclined surface 11, the yoke 15 being connected to the closure member 4 by means of the valve rod 14. This causes the locking of the closure member 4 if the locking body 10 presses against the yoke 15 with its inclined surface 11 in its locking position, as can be seen well in FIG. 21.

In the variants shown here, the locking drives 16 comprise in each case a first locking drive unit 17 which pre-stresses the locking body 10 permanently in the direction toward the locking position. This is a purely mechanical first locking drive unit 17 which is realized as an elastic pre-stressing body 19, here in concrete form as a spring body. Naturally, other elastic pre-stressing bodies 18 made of elastomer or other suitable elastic materials are also possible. By means of the transmission rod 32, said first locking drive unit 17 pulls the locking body 10 into its locking position whenever there is no active opposition by means of the second locking drive unit 19. The second locking drive unit 19, as already explained in the introduction, is provided for moving the locking body 10 into the releasing position. It is realized so as to be switchable on and off. If it is switched on, it counteracts the first locking drive unit such that the locking body 10 is moved into the releasing position or is held there. As soon as the second locking drive unit 19 is switched off, the first locking drive unit 17 moves the locking body 10 automatically into the locking position according to FIG. 21 such that the closure member 4 is locked in the closed position.

For the sake of completeness, it must be pointed out here once again that the inclined surface 11 does not have to be realized compulsorily on the locking body 10. It can just as well be an inclined surface 11 on the yoke 15, directly on the closure member 4 or on another component of the valve 1 which is connected to the closure member 4, with which the locking body 10 then interacts in a corresponding manner. In each case it is possible to provide corresponding inclined surfaces 11 both on the locking body 10 and on the yoke 15 or on another component of the valve 1 that is connected to the closure member 4 or even directly on the closure member 4, said corresponding inclined surfaces preferably then interacting in a corresponding manner. There are therefore the most varied possible solutions in terms of the invention both to the question of how many inclined surfaces 11 are present and interact and where the inclined surface(s) 11 is or are arranged and to the question as to whether the locking body 10 then acts directly or indirectly on the closure member.

Figure 6A:
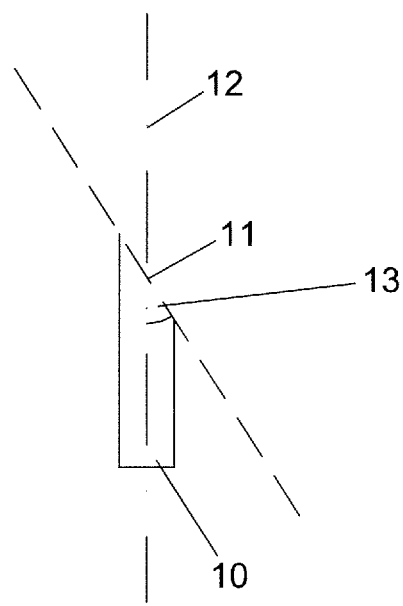
FIG. 6a shows a schematic representation of a preferred relative position between the inclined surface and the third movement path.

FIG. 6a shows in a schematic manner that it is preferred for there to be an acute angle 13 present between the inclined surface 11, wherever it is then realized, and the third movement path 12.

It must be pointed out with regard to the representations of the first, second and third movement paths 6, 8 and 12 chosen in the Figures that all of these movement paths are shown in an elongated manner so as to be better seen.

In whichever embodiment, a locking device 9, which can be produced with relatively generous tolerances without as a result impairing the operational reliability, is created by means of the inclined surface 11. Even, for example, temperature-related changes in the geometry of the individual components cannot jeopardize the operational reliability of the locking device that is realized according to the invention.

| Key to the reference numerals: | |
| --- | --- |
| 1 | Valve |
| 2 | Valve seat |
| 3 | Opening |
| 4 | Closure member |
| 5 | First valve drive |
| 6 | First movement path |
| 7 | Second valve drive |
| 8 | Second movement path |
| 9 | Locking device |
| 10 | Locking body |
| 11 | Inclined surface |
| 12 | Third movement path |
| 13 | Acute angle |
| 14 | Valve rod |
| 15 | Yoke |
| 16 | Locking drive |
| 17 | First locking drive unit |
| 18 | Elastic pre-stressing body |
| 19 | Second locking drive unit |
| 20 | Valve housing |
| 21 | Guide rod |
| 22 | Seal |
| 23 | Cylinder |
| 24 | Piston |
| 25 | Sliding bearing |
| 26 | Cylinder |
| 27 | Piston |
| 28 | Piston rod |
| 29 | Compensating pin |
| 30 | Cylinder |
| 31 | Piston |
| 32 | Transmission rod |

The invention claimed is:

1. A valve, comprising: a valve seat which surrounds an opening; a closure member that is movable between a closed position, pressed against the valve seat in which the closure member closes the opening, an intermediate position, raised from the valve seat and arranged aligned with the opening, and a maximum open position, in which the opening is completely or at least in part released; at least one first valve drive for moving the closure member along a first movement path at least one of back or forth between the maximum open position and the intermediate position; at least one second valve drive for moving the closure member along a second movement path at least one of back or forth between the intermediate position and the closed position; the first movement path and the second movement path being arranged in an angled manner with respect to one another; and at least one locking device that locks the closure member in the closed position, the locking device comprises at least one locking body which comprises at least one inclined surface, the locking body being movable relative to the closure member along a third movement path between a locking position, in which the closure member is locked in the closed position, and a releasing position, in which the closure member is movable out of the closed position into the intermediate position,
wherein the locking body acts on the closure member indirectly with or by use of the inclined surface, and
wherein the closure member is connected to a yoke by at least one valve rod and the locking body acts on the yoke directly with or by use of the inclined surface,
wherein the third movement path is arranged at an acute angle relative to the inclined surface.

2. The valve according to claim 1, wherein the inclined surface is formed in a wedge-shaped manner on the locking body.

3. The valve according to claim 1, wherein the third movement path is arranged parallel to the first movement path.

4. The valve according to claim 1, wherein the valve is a vacuum valve.

5. A valve, comprising: a valve seat which surrounds an opening; a closure member that is movable between a closed position, pressed against the valve seat in which the closure member closes the opening, an intermediate position, raised from the valve seat and arranged aligned with the opening, and a maximum open position, in which the opening is completely or at least in part released; at least one first valve drive for moving the closure member along a first movement path at least one of back or forth between the maximum open position and the intermediate position; at least one second valve drive for moving the closure member along a second movement path at least one of back or forth between the intermediate position and the closed position; the first movement path and the second movement path being arranged in an angled manner with respect to one another; and at least one locking device that locks the closure member in the closed position, the locking device comprises at least one locking body which comprises at least one inclined surface, the locking body being movable relative to the closure member along a third movement path between a locking position, in which the closure member is locked in the closed position, and a releasing position, in which the closure member is movable out of the closed position into the intermediate position, wherein the locking device comprises at least one locking drive in addition to the first valve drive and in addition to the second valve drive for the movement of the locking body along the third movement path, wherein the locking drive comprises a first locking drive unit which pre-stresses the locking body permanently in a direction toward the locking position, wherein the first locking drive unit is purely mechanical, wherein the third movement path is arranged at an acute angle relative to the inclined surface.

6. The valve according to claim 5, wherein the first locking drive unit comprises at least one elastic pre-stressing body.

7. The valve according to claim 6, wherein the at least one elastic pre-stressing body is a spring body.

8. The valve according to claim 6, wherein the locking drive comprises a second locking drive unit for the movement of the locking body into the releasing position, and the second locking drive unit is switchable on and off.

9. A valve, comprising: a valve seat which surrounds an opening; a closure member that is movable between a closed position, pressed against the valve seat in which the closure member closes the opening, an intermediate position, raised from the valve seat and arranged aligned with the opening, and a maximum open position, in which the opening is completely or at least in part released; at least one first valve drive for moving the closure member along a first movement path at least one of back or forth between the maximum open position and the intermediate position; at least one second valve drive for moving the closure member along a second movement path at least one of back or forth between the intermediate position and the closed position; the first movement path and the second movement path being arranged in an angled manner with respect to one another; and at least one locking device that locks the closure member in the closed position, the locking device comprises at least one locking body which comprises at least one inclined surface, the locking body being movable relative to the closure member along a third movement path between a locking position, in which the closure member is locked in the closed position, and a releasing position, in which the closure member is movable out of the closed position into the intermediate position, wherein the locking body acts on the closure member indirectly with or by use of the inclined surface, and wherein the closure member is connected to a yoke by at least one valve rod and the locking body acts on the yoke directly with or by use of the inclined surface, wherein the inclined surface is formed in a wedge-shaped manner on the locking body.

10. A valve, comprising: a valve seat which surrounds an opening; a closure member that is movable between a closed position, pressed against the valve seat in which the closure member closes the opening, an intermediate position, raised from the valve seat and arranged aligned with the opening, and a maximum open position, in which the opening is completely or at least in part released; at least one first valve drive for moving the closure member along a first movement path at least one of back or forth between the maximum open position and the intermediate position; at least one second valve drive for moving the closure member along a second movement path at least one of back or forth between the intermediate position and the closed position; the first movement path and the second movement path being arranged in an angled manner with respect to one another; and at least one locking device that locks the closure member in the closed position, the locking device comprises at least one locking body which comprises at least one inclined surface, the locking body being movable relative to the closure member along a third movement path between a locking position, in which the closure member is locked in the closed position, and a releasing position, in which the closure member is movable out of the closed position into the intermediate position, wherein the locking body acts on the closure member indirectly with or by use of the inclined surface, and wherein the closure member is connected to a yoke by at least one valve rod and the locking body acts on the yoke directly with or by use of the inclined surface, wherein the third movement path is arranged parallel to the first movement path.

* * * * *